United States Patent [19]

Sansone

[11] Patent Number: 4,898,917
[45] Date of Patent: Feb. 6, 1990

[54] N-SUBSTITUTED POLYBENZIMIDAZOLE POLYMER

[75] Inventor: Michael J. Sansone, Berkeley Heights, N.J.

[73] Assignee: Hoechst Celanese Corporation, Somerville, N.J.

[21] Appl. No.: 247,132

[22] Filed: Sep. 21, 1988

Related U.S. Application Data

[63] Continuation-in-part of Ser. No. 99,431, Sep. 11, 1987, abandoned.

[51] Int. Cl.$^4$ .............................................. C08G 73/18
[52] U.S. Cl. ................................... 525/420; 525/435; 528/331; 528/342
[58] Field of Search ................ 525/435, 420; 528/331, 528/342

[56] References Cited
U.S. PATENT DOCUMENTS
4,579,915 4/1986 Choe .................................. 525/435

Primary Examiner—Harold D. Anderson
Attorney, Agent, or Firm—Lynch, Cox, Gilman & Mahan

[57] ABSTRACT

This invention discloses a unique process for the preparation of N-substituted polybenzimidazole polymers from unsubstituted polybenzimidazole polymers. An unsubstituted polybenzimidazole polymer is first reacted with an alkali hydride to produce a polybenzimidazole anion which is then reacted with a substituted or an unsubstituted alkyl, aryl or alkenyl methyl halide to produce an N-substituted alkyl, alkenyl or aryl polybenzimidazole polymer. The substituted polybenzimidazole polymer produced by this process can be formed into a wide range of products, such as membranes, films, resins or fibers. The product can be designed to meet special applications by the choice of the substituent. These substituted polybenzimidazole polymers can be utilized for numerous applications including reverse osmosis, ultrafiltration, microfiltration, electrodialysis, ion exchange and affinity chromatography.

23 Claims, No Drawings

N-SUBSTITUTED POLYBENZIMIDAZOLE POLYMER

CROSS REFERENCE TO RELATED APPLICATIONS

Continuation-in-part of Ser. No. 07/099,431, filed Sept. 11, 1987, now abandoned.

BACKGROUND OF THE INVENTION

1. Field of Invention

This invention relates to substituted polybenzimidazole polymers and processes for their production. More particularly the invention relates to N-substituted alkyl, alkenyl or aryl substituted polybenzimidazole polymers and processes for their production.

2. Prior Art

Polybenzimidazoles are a known class of heterocyclic polymers which are characterized by a high degree of thermal and chemical stability. Processes for their production are disclosed in U.S. Re. 26,065 and U.S. Pat. Nos. 3,313,783, 3,509,108, 3,555,389, 3,433,772, 3,408,336, 3,549,603, 3,708,439, 4,154,919 and 4,312,976. (All patents enumerated herein are incorporated by reference).

Although polybenzimidazole polymers are generally more resistant to chemical reaction than other types of polymers, such as cellulose acetate polymers, reactions at the imidazole nitrogen-hydrogen bond on the polybenzimidazole polymer will occur under certain condition, thereby adversely affecting the performance of the polybenzimidazole polymer.

One method of reducing this reactivity is by replacing the imidazole hydrogen with a less reactive substituent to produce a substituted polybenzimidazole polymer. For example, U.S. Pat. No. 4,579,915 discloses a substituted polybenzimidazole polymer wherein the imidazole hydrogen is replaced by an aromatic substituent corresponding to the formula:

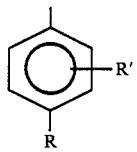

where R is nitro, cyano or trifloromethyl and R' is hydrogen, alkyl, nitro, cyano or trifloromethyl. In addition, U.S. Pat. No. 4,377,546 discloses a phenyl substituted polybenzimidazole polymer. However, neither patent discloses the instant process for production of N-substituted polybenzimidazole polymers.

U.S. Pat. No. 3,943,125 discloses a vast array of substituted tetramino, heterocyclic compounds useful in the preparation of substituted polybenzimidazole polymers. However, the process for production of the substituted polybenzimidazole polymers disclosed in the '125 patent is significantly different from that disclosed in the instant invention.

U.S. Pat. No. 3,518,234 discloses aryl substituted polybenzimidazole polymers but fails to disclose the instant process for the production of N-substituted polybenzimidazole polymers.

U.S. Pat. Nos. 3,578,644 and 4,549,388 disclose processes for the production of hydroxyl modified polybenzimidazoles, but fail to disclose N-alkyl, N-aryl or N-alkenyl substituted polybenzimidazole polymers or a process for their production.

Accordingly, it is an object of the present invention to prepare N-substituted polybenzimidazole polymers.

It is a further object of this invention to prepare N-substituted polybenzimidazole polymers that exhibit a high degree of chemical and thermal stability.

It is a still further object of this invention to prepare N-substituted polybenzimidazole polymers directly from unsubstituted polybenzimidazole polymers.

It is an additional object of this invention to prepare N-substituted polybenzimidazole polymers using an alkali hydride to generate polybenzimidazole anions which are subsequently reacted with a substituted methyl halide to generate N-substituted polybenzimidazole polymers.

These and other objects, as well as the scope, nature, and utilization of the process will be apparent to those skilled in the art from the following description and appended claims.

SUMMARY OF INVENTION

The present invention involves a process for the production of substituted polybenzimidazole polymers as follows:

a. preparing a polybenzimidazole polymer solvent solution;

b. reacting the polybenzimidazole polymer in the solution with an alkali hydride to generate a polybenzimidazole anion; and c. reacting the polybenzimidazole anion with a substituted methyl halide having the general formula of R—CH₂X, wherein R is hydrogen, an unsubstituted or substituted alkyl, an unsubstituted or substituted alkenyl, or an unsubstituted or substituted aryl group, wherein the substituents are selected from the group consisting of methyl, ethyl, pyridyl, halo, cyano, or nitro groups; and wherein X is a halide substituent selected from the group consisting of chloro, bromo or iodo, to produce an N-substituted polybenzimidazole polymer.

The substituted polybenzimidazole polymer produced by this process can be formed into a wide range of products such as membranes, films, resins or fibers. Because these products are formed from substantially substituted polybenzimidazole polymers, they are highly resistant to chemical reaction and exhibit high strength and thermal stability.

DETAILED DESCRIPTION OF INVENTION

A. The Starting Polymer

The polybenzimidazole starting materials are a known class of heterocyclic polymers which are characterized by a recurring unit of the following Formulas I and II:

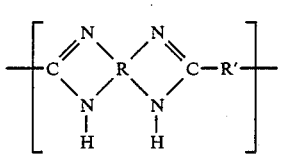

Formula I wherein R is a tetravalent aromatic nucleus, preferably symmetrically substituted, with the nitrogen atoms forming the bibenzimidazole rings being paired upon adjacent carbon atoms, i.e., ortho carbon atoms, of the aromatic nucleus, and R' is a member of the class consisting of (1) an aromatic ring, (2) an alkylene group (preferably those having four to eight carbon atoms), and (3) a heterocyclic ring from the class consisting of (a) pyridine, (b) pyrazine, (c) furan, (d) quinoline, (e) thiophene, and (f) pyran; and

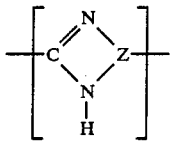

Formula II wherein Z is an aromatic nucleus having the nitrogen atoms forming the benzimidazole ring paired upon adjacent carbon atoms of the aromatic nucleus.

Preferably, aromatic polybenzimidazoles are selected from polymers consisting essentially of recurring units of Formulas I and II wherein R' is an aromatic ring or a heterocyclic ring.

Polybenzimidazoles having the recurring units of Formula II may be prepared by self-condensing a trifunctional aromatic compound containing only a single set of ortho-disposed diamino substitutes and an aromatic, preferably phenyl, carboxylate ester substituent. Exemplary of polymers of this type is poly-2,5(6)-benzimidazole prepared by the autocondensation of phenyl-3,4-diaminobenzoate.

The aromatic polybenzimidazoles having the recurring units of Formula I may be prepared by condensing an aromatic tetraamine compound containing a pair of ortho-diamino substituents on the aromatic nucleus with a dicarboxyl compound selected from the class consisting of (a) the diphenyl ester of an aromatic dicarboxylic acid, (b) the diphenyl ester of a heterocyclic dicarboxylic acid wherein the carboxyl groups are substituents upon carbon in a ring compound selected from the group consisting pyridine, pyrazine, furan, quinoline, thiophene and pyran and (c) an anhydride of an aromatic dicarboxylic acid.

Examples of polybenzimidazoles which have the recurring structure of Formula I are as follows:
poly-2,2'-(m-phenylene)-5,5'-bibenzimidazole;
poly-2,2'-(pyridylene-3'', 5''')-5,5'-bibenzimidazole;
poly-2,2'-(furylene-2'', 5''')-5,5'-bibenzimidazole;
poly-2,2'-(naphthalene-1'', 6''')-5,5'-bibenzimidazole;
poly-2,2'-(biphenylene-4'', 4''')-5,5'-bibenzimidazole;
poly-2,2'-amylene-5,5'-bibenzimidazole;
poly-2,2'-octamethylene-5,5'-benzimidazole;
poly-2,6-(m-phenylene)-diimidazolbenzene;
poly-2,2'-cyclohexeneyl-5,5'-bibenzimidazole;
poly-2,2'-(m-phenylene)-5,5'-di(benzimidazole) ether;
poly-2,2'-(m-phenylene)-5,5'-di(benzimidazole) sulfide;
poly-2,2'-(m-phenylene)-5,5'-di(benzimidazole) methane;
poly-2,2'-(m-phenylene)-5,5'-di(benzimidazole)propane-2,2'; and
poly-2,2'-(m-phenylene)-5', 5'''-di(benzimidazole) propane-2,2' ethylene-1,2, where the double bonds of the ethylene groups are intact in the final polymer.

The preferred polybenzimidazole for use in the present process is one prepared from poly-2,2'-(m-phenylene)-5,5'-bibenzimidazole, the recurring unit of which is:

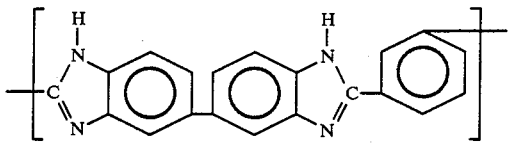

Any polymerization process known to those skilled in the art may be employed to prepare the polybenzimidazole polymer which is utilized as the starting material for the present invention. With respect to aromatic polybenzimidazoles, preferably, equimolar quantities of the monomeric tetraamine and dicarboxyl compound may be introduced into a first stage melt polymerization reaction zone and heated therein at a temperature above about 200° C., preferably at least 250° C., and more preferably from about 270° C. to 300° C. The reaction is conducted in a substantially oxygen-free atmosphere, i.e., below about 20 ppm oxygen and preferably below about 8 ppm oxygen, until a foamed prepolymer is formed. Usually, the first stage reaction is continued until a prepolymer is formed having an inherent viscosity, expressed in deciliters per gram, of at least 0.1, and preferably from about 0.13 to 0.3 (determined from a solution of 0.4 grams of the polymer in 100 milliliters of 97 percent $H_2SO_4$ at 25° C.).

After the conclusion of the first stage reaction, which normally takes at least 0.5 hours and preferably 1 to 3 hours, the foamed prepolymer is cooled and then powdered or pulverized in any convenient manner. The resulting prepolymer powder is then introduced into a second stage polymerization reaction zone wherein it is heated under substantially oxygen-free conditions to yield a polybenzimidazole polymer product, desirably having an I.V., of at least 0.4, (e.g., 0.8 to 1.1 or more).

The temperature employed in the second stage is at least 250° C., preferably at least 325° C., and more preferably from about 350° to 425° C. The second stage reaction generally takes at least 0.5 hours, and preferably from about 1 to 4 hours or more. It is, of course, also possible to prepare the instant polymers via a one-step reaction. However, the previously described two-step process is preferred.

B. The Polymer Solution

The solvents utilized to form the polybenzimidazole polymer solution include those solvents which are commonly recognized as being capable of dissolving the particular polybenzimidazole polymer. For example, the solvents may be selected from those commonly utilized in the formation of a polybenzimidazole dry spinning solution including N,N-dimethylacetamide, N,N-dimethylformamide, dimethylsulfoxide, and N-methyl-2-pyrrolidone. The particularly preferred solvents are N,N-dimethylacetamide and N-methyl-2-pyrrolidone. Additional representative solvents include formic acid and sulfuric acid.

The polymer solution may be prepared, for example, by dissolving sufficient polybenzimidazole in the solvent to yield a final solution containing from about 1 to about 35 percent by weight of the polymer based on the total weight of the solution. When the solution contains concentrations of polybenzimidazole polymer less than about 5 percent, the substitutions obtained are less than optimum. When the concentration of the polybenzimidazole polymers are above about 25 percent, the solution tends to be too viscous. Although this high viscosity can be overcome by heating the polymer solution, in a preferred embodiment, the concentration of the polybenzimidazole polymer ranges from about 5 to about 25 percent by weight. The quantity of the polybenzimidazole dissolved in the solvent should be such that the resulting solution has a viscosity of about 50 to about 4,000 poises at 30° C. and preferably from about 400 to about 600 poises.

One suitable means of dissolving the polymer in the solvent is by mixing the materials at a temperature above the normal boiling point of the solvent, for example, about 25° C. to about 120° C. above such boiling point, at a pressure of about 2 to about 15 atmosphere for a period of about 1 to about 5 hours under constant stirring. The resulting solution is preferably filtered to remove any undissolved polymer. A minor amount of lithium chloride (from about 0.5 to about 5 percent by weight based on the weight of the polybenzimidazole in the solution) optionally may be added to the solution to prevent the polybenzimidazole polymer from phasing out of the solution upon standing for extended periods of time.

C. Formation of the Polybenzimidazole Anion

To the polybenzimidazole polymer solution is added an alkali hydride to generate the polybenzimidazole anion as shown in the following reaction using the polybenzimidazole polymer disclosed in Formula I:

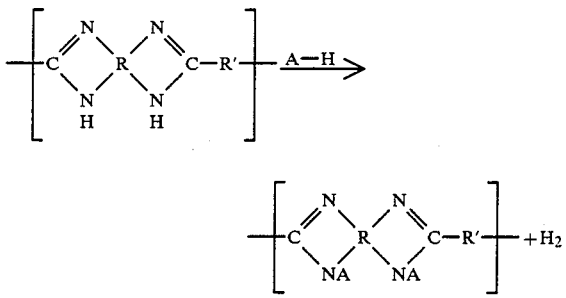

wherein the polybenzimidazole polymer is as previously disclosed and A is an alkali cation selected from the group consisting of lithium, sodium or potassium.

Although any alkali hydride, such as lithium, sodium or potassium hydride may be used in the reaction, lithium hydride is preferred for several reasons. The lithium salts generated in the subsequent substitution reaction do not interferingly react with the N-substituted polybenzimidazole polymers produced. [Further, it is presumed that the small ionic radius of the lithium cation allows it to be well solvated, which disrupts the ion pairing between it and the polybenzimidazole anion. This disruption increases the solubility of the lithium salt and simultaneously generates a more nucleophilic polybenzimidazole anion, which is thus more reactive.]

Although low concentrations, of the alkali hydride can be used, in a preferred embodiment the ratio of alkali halide groups to the available imidazole nitrogen-hydrogen sites on the polybenzimidazole polymer should be about 0.01:1 to about 5:1 and, in a more preferred embodiment, the ratio is from about 0.25:1 to about 1:1. When stoichiometric quantities of the alkali hydride in relationship to the available imidazole nitrogen-hydrogen sites on the polybenzimidazole polymer are reacted with a polybenzimidazole polymer, at least about 60 percent of the available imidazole nitrogen-hydrogen sites are ionized. Higher concentrations of the alkali hydride produce greater percentages of ionization of the polybenzimidazole polymer, which subsequently result in greater substitutions on the polybenzimidazole polymer in the succeeding substitution reaction. However, no significant increase in substitution is achieved when the ratio of alkali hydride to the available imidazole/nitrogen hydrogen sites exceeds about 2:1.

Following the addition of the alkali hydride to the polybenzimidazole polymer solution, the solution is heated to a temperature of about 50° C. to about 120° C. and allowed to react under constant stirring for a period of about 5 to about 48 hours. During the polybenzimidazole polymer ionization reaction, hydrogen gas evolves and is discharged. When hydrogen gas evolution ceases, it may be assumed that the reaction has gone to completion.

D. The Substitution Reaction

It has been surprisingly found that once the alkali hydride removes the imidazole hydrogen to create the polybenzimidazole anion, a wide variety of substitutions on the polybenzimidazole anion are possible. To produce a substituted polybenzimidazole polymer, a substituted methyl halide compound is reacted with the polybenzimidazole anion. The substituted methyl halide has the general formula of $R-CH_2X$, wherein R is hydrogen, an unsubstituted or substituted alkyl, an unsubstituted or substituted alkenyl, or an unsubstituted or substituted aryl group, wherein typical substituents include methyl, ethyl, pyridyl, halo, cyano, or nitro groups and wherein X corresponds to a halide anion selected from the group consisting of chloro, bromo and iodo. Although the choice of the halide anion is not critical to the reaction, the preferred halide is bromo.

The composition of the R substituent depends upon the desired N-substituted polybenzimidazole end product. In a preferred embodiment, the R substituent is hydrogen or a $C_1$ to $C_{20}$ unsubstituted or substituted alkyl member, wherein typical substituents are selected from the group consisting of methyl, ethyl, pyridyl, halo, cyano or nitro.

It is also preferred that the carbon adjacent to the halide be unsubstituted, since substitutions on this carbon atom may reduce or eliminate the reactivity of the reactant. Although the concentration of the substituted methyl halide reactant is not critical, to produce substituted polybenzimidazole polymers with at least about 20 percent of the available imidazole anion sites substituted, at least about a stoichiometric concentration of the substituted methyl halide reactant, when compared to the available imidazole anion sites, should be added to the polybenzimidazole anion solution. By increasing the concentration of the substituted methyl halide reactant, higher percentages of substitution can be achieved. In a preferred embodiment, the ratio of the substituted methyl halide reactant to the available polybenzimidazole anion sites ranges from about 0.25:1 to about 1:1. Higher concentrations fail to achieve significantly higher substitutions. Since the percentage of substitution on the polybenzimidazole polymer starting material is partially dependent upon the percentage of polybenzimidazole anions produced, high percentages of substitution are only possible when the hydride reaction also generates high percentages of polybenzimidazole anions. Thus, in a preferred embodiment the ratios of the alkali hydride to the imidazole nitrogen-hydrogen sites and of the substituted methyl halide reactant to the available polybenzimidazole anion sites are both from about 2:1 to about 5:1.

To complete the reaction, the substituted methyl halide reactant may simply be added to the polybenzimidazole anion polymer solution at room temperature. However, to prevent localized precipitation, it is preferred to mix the substituted methyl halide reactant with an equal or lesser quantity of the solvent for the polybenzimidazole solution prior to the addition of the reactant.

After addition of the substituted methyl halide, the mixture is heated to a temperature of between about 70° C. and about 150° C. and allowed to react under constant stirring for a period of about 10 to about 48 hours. Higher molecular weight substituted methyl halide reactants may require higher temperatures of reaction and greater reaction times. In a preferred embodiment, the reaction is allowed to run at a temperature of about 80° C. to about 120° C. for a period of 15 to 36 hours.

In an example of the instant process, the reaction of the polybenzimidazole anion with ethyl iodide goes to completion by the following reaction scheme using the polybenzimidazole anion previously disclosed:

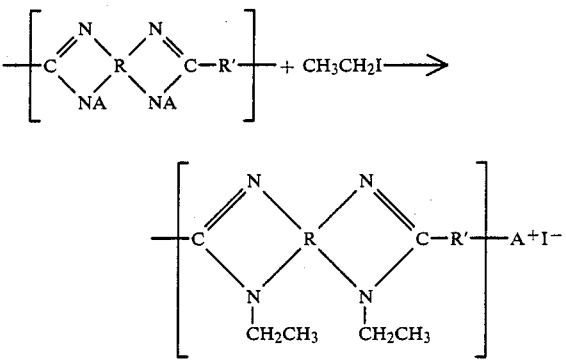

To precipitate the substituted polybenzimidazole polymer from solution, a non-solvent for the substituted polybenzimidazole is added to the reaction vessel. Preferably, an aqueous solution is used as the precipitating agent, although other non-solvents, such as acetone may be used. The substituted polybenzimidazole polymer is then filtered and washed with a non-solvent for the substituted polybenzimidazole polymer to remove excess solvent. Preferably, the non-solvent wash solution is comprised of water or acetone.

The N-substituted polybenzimidazole polymer produced by this process may be converted to products exhibiting a wide range of utility, especially in separations field. Membranes, fibers, beads, and films made from the substituted polybenzimidazoles exhibited a wide range of physical and morphological properties which allow them to be utilized in a wide variety of applications including but not limited to reverse osmosis ultrafiltration, microfiltration, electrodialysis, ion exchange, and affinity chromatography. The polymer can be tailor made to meet a specific application by a judicious choice of the substituent. In addition, increased stability in some environments can also be achieved by N-substitution preventing deleterious reactions from occurring at the imidazole nitrogen.

The following examples are given as specific illustrations of the invention. All parts and percentages are by weight unless otherwise stated. It is understood however, that the invention is not limited to the specific details set forth in the examples.

EXAMPLE 1

To a round bottom reaction vessel were added 73.5 grams of a 15 percent by weight poly-2-2'(m-phenylene)-5,5'-bibenzimidazole polymer solution dissolved in N-methyl-2-pyrrolidone and 0.48 grams of lithium hydride. The solution was heated to 70° C. and maintained at that temperature under constant stirring for four hours until hydrogen evolution ceased. Five grams of methyl iodide were added and the temperature of the solution was raised to 80° C. After eight minutes, a reflux condenser was secured to the reaction vessel and the reaction continued for 20 hours. Nuclear magnetic resonance spectroscopy was run on the reaction product, which disclosed an 82 percent substitution of the imidazole nitrogen sites on the polymer. At least 2 and possibly 4 different types of methylated polybenzimidazole polymers were produced. Nuclear magnetic resonance spectroscopy disclosed that 55 percent of the available imidazole nitrogen-hydrogen sites on the polybenzimidazole polymer were methylated and 13 percent were quaternized.

EXAMPLE 2

To a round bottom reaction flask were added 10 grams of poly-2-2'(m-phenylene)-5,5'-bibenzimidazole dissolved in 90 grams of N-methyl-2-pyrrolidone, 0.5 grams of lithium chloride and 0.52 grams of lithium hydride. The solution was heated to 60° C. and maintained at that temperature for 12 hours. 10.13 grams of ethyl iodide mixed with 5 grams of N-methyl-2-pyrrolidone were added to the solution. The temperature of the reaction solution was raised to 65° C. and maintained at that temperature for 5 hours. After cooling to room temperature, nuclear magnetic resonance spectroscopy was run on the reaction product which disclosed 50 percent substitution with ethyl groups on the imidazole nitrogen of the polybenzimidazole polymer.

An additional 5.0 grams of ethyl iodide were added to the solution and the mixture was heated to 80° C. under constant stirring for an additional 8 hours. Nuclear magnetic resonance analysis run on the reaction product disclosed that 77 percent of the available nitrogen-hydrogen sites on the polybenzimidazole polymer had been substituted with ethyl groups.

EXAMPLE 3

To a 2 liter round bottom reaction vessel were added 764.2 grams of a 25.6 percent poly-2,2'-(m-phenylene)-5,5'-bibenzimidazole dope dissolved in N,N-dimethylacetamide and 7.6 grams of lithium hydride. The contents of the reaction vessel were heated at 75° C. under constant stirring for 16 hours. 237 grams of $CH_3(CH_2)_{11}Br$ mixed with 81.6 grams of N,N-dimethylacetamide were then added to the solution. The reaction vessel was heated to 75° C. and held at that temperature for 24 hours under constant stirring. Nuclear magnetic resonance spectroscopy run on the reaction product disclosed 58 percent substitution with $CH_3(CH_2)_{10}CH_2-$ on the available imidazole nitrogen sites of the polybenzimidazole polymer.

EXAMPLE 4

To a 2 liter round bottom reaction vessel were added 613.7 grams of a 25.6 percent poly-2,2'-(m-phenylene)-5,5'-bibenzimidazole dissolved in N,N-dimethylacetamide solution and 6.12 grams of lithium hydride. The contents of the vessel were heated for 18 hours at 80° C. 190 grams of $Br(CH_2)_{11}CH_3$ mixed with 368.2 grams of N,N-dimethylacetamide were then added to the solution. The reactants were again heated to 80° C. and allowed to react for 24 hours. The contents were then heated to 100° C. for 60 hours. Nuclear magnetic resonance spectroscopy run on the reaction product disclosed that 67 percent of the available imidazole nitrogen-hydrogen sites on the polybenzimidazole polymer had been substituted with $CH_3(CH_2)_{10}CH_2-$.

EXAMPLE 5

To a round bottom reaction vessel were added 84.4 grams of a 25 percent poly-2,2'-(m-phenylene)-5,5'-bibenzimidazole dissolved in N,N-dimethylacetamide solution and 0.6 grams of lithium hydride. The contents of the flask were heated to 75° C. under constant stirring and maintained at that temperature for a period of 24 hours. 24.6 grams of $Br(CH_2)_{17}CH_3$ mixed with 6.37 grams of N,N-dimethylacetamide were added to the solution heated to 85° C. and maintained at that temperature under constant stirring for 20 hours. The reaction product was analyzed by nuclear magnetic resonance spectroscopy which disclosed a 46 percent substitution of the available imidazole nitrogen-hydrogen sites on the polybenzimidazole polymer with $CH_3(CH_2)_{16}CH_2-$.

EXAMPLE 6

To a reaction flask were added 588.6 grams of a 25.6 percent poly-2,2'-(m-phenylene)-5,5'-bibenzimidazole dissolved in N,N-dimethylacetamide solution and 5.9 grams of lithium hydride. The contents of the flask were heated to 75° C. and maintained at that temperature under constant stirring for 15 hours. 141.6 grams of $Br(CH_2)_7CH_3$ were added to the reaction vessel. The temperature of the reaction was increased to 80° C. and maintained at that temperature for 36 hours. A sample of the end product was analyzed under nuclear magnetic resonance spectroscopy which disclosed 46 percent substitution with $CH_3(CH_2)_6CH_2-$ on the available imidazole nitrogen-hydrogen sites on the polybenzimidazole polymer.

EXAMPLE 7

To a reaction vessel were added 96 grams of an 18 percent poly-2,2'-(m-phenylene)-5,5'-bibenzimidazole dissolved in N,N-dimethylacetamide dope and 0.7 grams of lithium hydride. The contents of the vessel were heated to 80° C. under constant stirring for 16 hours. 13.4 grams of $Br(CH_2)_4CH_3$ were added to the solution and the contents were maintained at 80° C. for a period of 24 hours. A sample of the end product was analyzed under nuclear magnetic resonance spectroscopy which showed substitution with $CH_2(CH_2)_3CH_2-$ of 42 percent of the available imidazole nitrogen-hydrogen sites on the polybenzimidazole polymer.

EXAMPLE 8

To a reaction vessel were added 460 grams of a 25.8 percent poly-2,2'-(m-phenylene)-5,5'-bibenzimidazole dissolved in N,N-dimethylacetamide dope and 4.6 grams of lithium hydride. The solution was heated to 75° C. under constant stirring for 14 hours. 191 grams of $Br(CH_2)_{17}CH_3$ mixed with 23.7 grams of dimethylacetamide were then added to the reaction vessel. The temperature of the contents was raised to 80° C. and held at that temperature for 24 hours. Nuclear magnetic resonance spectroscopy run on the reaction product showed a 52 percent substitution of the available imidazole nitrogen-hydrogen sites on the polybenzimidazole polymer with $CH_3(CH_2)_{10}CH_2-$.

EXAMPLE 9

To a reaction vessel were added 81.7 grams of an 18 percent poly-2,2'-(m-phenylene)-5,5'-bibenzimidazole dissolved in N,N-dimethylacetamide dope and 0.57 grams of lithium hydride. The reaction contents were heated to 80° C. and held at that temperature for 16 hours, at which time the contents were allowed to return to room temperature. 8.6 grams of $BrCH_2CH=CH_2$ were added to the solution, heated to 60° C. and held at that temperature for 6 hours. Nuclear magnetic resonance spectroscopy run on the reaction product disclosed 47 percent substitution of the available imidazole nitrogen-hydrogen sites on the polybenzimidazole polymer with $CH_2CH=CH_2-$.

As is apparent from these Examples, a wide variety of N-substituted polybenzimidazole polymers can be produced exhibiting a high percentage of substitution. These substituted polybenzimidazole polymers can be used for the production of broad range of separatory articles such as membranes, fibers or films. Since the N-substituted polybenzimidazole polymers are substituted, they will be less reactive and produce more stable products.

I claim:

1. A process for the production of substituted polybenzimidazole polymers which comprises the following steps:
    a. preparing a polybenzimidazole polymer solvent solution;
    b. forming a polybenzimidazole anion from the polybenzimidazole polymer in solution; and
    c. reacting the polybenzimidazole anion with a substituted methyl halide having the general formula of $R-CH_2X$, wherein R is selected from the group consisting of hydrogen, unsubstituted and substituted alkyl, unsubstituted and substituted alkenyl, and unsubstituted and substituted aryl groups wherein the substituents are selected from methyl, ethyl, pyridyl, halo, cyano, or nitro and wherein X is a halide substituent selected from the group consisting of chloro, bromo, and iodo, to produce an N-substituted polybenzimidazole polymer.

2. A process for the production of substituted polybenzimidazole polymers which comprises the following steps:
    a. preparing a polybenzimidazole polymer solvent solution;
    b. reacting the polybenzimidazole polymer in the solution with an alkali hydride to form a polybenzimidazole anion; and
    c. reacting the polybenzimidazole anion with a substituted methyl halide having the general formula of $R-CH_2X$, wherein R is selected from the group consisting of hydrogen, unsubstituted and substituted alkyl, unsubstituted and substituted alkenyl, and unsubstituted and substituted aryl groups wherein the substituents are selected from methyl, ethyl, pyridyl, halo, cyano, or nitro and wherein X is a halide substituent selected from the group consisting of chloro, bromo, iodo, to produce an N-substituted polybenzimidazole polymer.

3. A process for producing a substituted polybenzimidazole polymer which comprises the following steps:
   a. preparing about a 5 to about a 25 percent by weight poly-2,2'-(m-phenylene)-5,5'-bibenzimidazole polymer in N,N-dimethylacetamide solution;
   b. reacting the polymer in the solution with lithium hydride to generate an anion of poly-2,2'-(n-phenylene)-5,5'-bibenzimidazole; and
   c. reacting the anion with a substituted methyl halide having the general formula of R—CH$_2$X wherein R is selected from the group consisting of hydrogen and C$_1$ to C$_{20}$ unsubstituted alkyl groups and wherein X is bromo to produce an N-alkyl polybenzimidazole polymer.

4. The process of claim 2 wherein the alkali hydride is selected from the group consisting of lithium hydride, potassium hydride, and sodium hydride.

5. The process of claim 2 wherein the alkali halide is lithium hydride.

6. The process as in any of claims 1 or 2 wherein the polybenzimidazole polymer starting material is comprised of recurring monomeric units of:

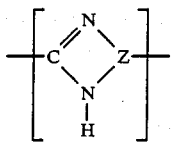

wherein Z is an aromatic nucleus having the nitrogen atoms forming the benzimidazole ring paired upon adjacent carbon atoms of the aromatic nucleus.

7. The process as in any of claims 1 or 2 wherein the solvent capable of dissolving the polybenzimidazole polymer is selected from the group consisting of N,N-dimethylacetamide, N,N-dimethylformamide, dimethylsulfoxide and N-methyl-2-pyrrolidone.

8. The process of claim 2 wherein the ratio of alkali halide groups to the available imidazole nitrogen hydrogen sites on the polybenzimidazole polymer is from about 0.01:1 to about 5:1.

9. The process of claim 2 wherein the ratio of alkali halide groups to the available imidazole nitrogen hydrogen sites on the polybenzimidazole polymer is from about 0.25:1 to about 1:1.

10. The process as in any of claims 1, 2 or 3 wherein the percentage of polybenzimidazole anions produced is at least about 60 percent.

11. The process as in any of claims 1 or 2 wherein the concentration of the polybenzimidazole polymer in the solvent solution is from about 5 to about 25 percent by weight based on the total solution weight.

12. The process of claim 2 wherein the halide substituent, X, is bromo.

13. The process as in any of claims 2 or 3 wherein the alkali halide is reacted with the polybenzimidazole polymer at a temperature of about 50° C. to about 120° C. for a period of about 5 to 48 hours.

14. The process as in any of claims 1, 2 or 3 wherein the substituted methyl halide is reacted with the polybenzimidazole polyanion at a temperature from about 70° C. to about 150° C. for a period of about 10 to about 48 hours.

15. The N-substituted polybenzimidazole polymer produced by the process of claim 1.

16. The N-substituted polybenzimidazole polymer produced by the process of claim 2.

17. A process for producing a substituted polybenzimidazole polymer which comprises the following steps:
   a. preparing a polybenzimidazole polymer solvent solution wherein the polybenzimidazole polymer consists essentially of recurring units of the following formula:

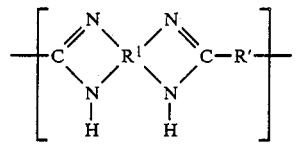

wherein R is a tetravelent aromatic nucleus, with the nitrogen atoms forming the benzimidazole rings being paired upon adjacent carbon atoms of the aromatic nucleus, and R' is a member of the class consisting of (1) an aromatic ring, (2) an alkylene group and (3) a heterocyclic ring from the class consisting of (a) pyridine, (b) pyrazine, (c) furan, (d) quinoline, (e) thiophene, and (f) pyran;
   b. reacting the polybenzimidazole polymer in the solution with lithium hydride, wherein the ratio of the lithium hydride to the available imidazole nitrogen-hydrogen sites on the polybenzimidazole polymer is from about 0.01:1 to about 5:1, to produce a polybenzimidazole anion; and
   c. reacting the polybenzimidazole anion with a substituted methyl halide having the general formula of R—CH$_2$X, wherein R is selected from the group consisting of hydrogen and C$_1$ to C$_{20}$ unsubstituted and substituted alkyl groups consisting of methyl, ethyl, pyridyl, halo, cyano, or nitro, and wherein X is bromo, to produce an N-alkyl polybenzimidazole polymer.

18. The process of claim 17 wherein the solvent capable of dissolving the polybenzimidazole polymer is selected from the group consisting of N,N-dimethylacetamide, N,N-dimethylformamide, dimethylsulfoxide and N-methyl-2-pyrrolidone.

19. The process of claim 17 wherein the percentage of polybenzimidazole anions produced is at least about 60 percent.

20. The process of claim 17 wherein the concentration of the polybenzimidazole polymer in the solvent solution is from about 5 to about 25 percent by weight based on the total solution weight.

21. The process of claim 17 wherein the alkali halide is reacted with the polybenzimidazole polymer at a temperature of about 50° C. to about 120° C. for a period of about 5 to 48 hours.

22. The process of claim 17 wherein the substituted methyl halide is reacted with the polybenzimidazole polyanion at a temperature from about 70° C. to about 150° C. for a period of about 10 to about 48 hours.

23. The N-alkyl polybenzimidazole polymer produced by the process of claim 17.

* * * * *